US011831020B2

(12) United States Patent
Nakai et al.

(10) Patent No.: US 11,831,020 B2
(45) Date of Patent: Nov. 28, 2023

(54) CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventors: Akito Nakai, Tokyo (JP); Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/007,478

(22) PCT Filed: Aug. 24, 2021

(86) PCT No.: PCT/JP2021/031043
§ 371 (c)(1),
(2) Date: Jan. 31, 2023

(87) PCT Pub. No.: WO2022/045153
PCT Pub. Date: Mar. 3, 2022

(65) Prior Publication Data
US 2023/0275234 A1    Aug. 31, 2023

(30) Foreign Application Priority Data

Aug. 31, 2020    (JP) ................. 2020-146307

(51) Int. Cl.
*H01M 4/62*    (2006.01)
(52) U.S. Cl.
CPC ................. *H01M 4/625* (2013.01)
(58) Field of Classification Search
None
See application file for complete search history.

(56) References Cited

U.S. PATENT DOCUMENTS 11,108,050 B2    8/2021    Kim et al.

FOREIGN PATENT DOCUMENTS

| CN | 107851800 A | * | 3/2018 | .......... H01M 10/052 |
| CN | 107851801 A | * | 3/2018 | .......... H01M 10/052 |
| CN | 108140841 A | * | 6/2018 | ........... C01B 32/174 |
| EP | 3324468 A1 | * | 5/2018 | ............. C08C 19/02 |
| JP | 2018533175 A | | 11/2018 | |
| KR | 20180075180 A | * | 7/2018 | ............ H01M 4/139 |
| WO | WO-2017164703 A1 | * | 9/2017 | ........... C01B 32/174 |

OTHER PUBLICATIONS

Mar. 16, 2021, Decision to Grant a Patent issued by the Japan Patent Office in the corresponding Japanese Patent Application No. 2020-146307.
Feb. 28, 2023, International Preliminary Report on Patentability issued in the International Patent Application No. PCT/JP2021/031043.

* cited by examiner

*Primary Examiner* — Carlos Barcena
(74) *Attorney, Agent, or Firm* — KENJA IP LAW PC

(57) ABSTRACT

Provided is a conductive material dispersion liquid for an electrochemical device capable of forming an electrode that has excellent flexibility and smoothness and can cause an electrochemical device to display excellent cycle characteristics. The conductive material dispersion liquid contains a conductive material, a dispersant including CNTs, and a dispersion medium. The conductive material dispersion liquid has a Casson viscosity of 30 $(Pa \cdot s)^{1/2}$ or less, Casson yield value of 20 $Pa^{1/2}$ or less, and hysteresis constant calculated by formula (I) (hysteresis constant $C=(N_1-N_2)/N_1$) of 0.7 or less. $N_1$ is viscosity (Pa·s) of the conductive material dispersion liquid at a shear rate of 10 $s^{-1}$ when viscosity (25° C.) is measured while increasing shear rate from $10^{-2}$ $s^{-1}$ to $10^3$ $s^{-1}$, and $N_2$ is viscosity (Pa·s) thereof at a shear rate of 10 $s^{-1}$ when viscosity (25° C.) is measured while decreasing shear rate from $10^3$ $s^{-1}$ to $10^{-2}$ $s^{-1}$.

6 Claims, No Drawings

CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a conductive material dispersion liquid for an electrochemical device, a slurry for an electrochemical device electrode, an electrode for an electrochemical device, and an electrochemical device.

BACKGROUND

Electrochemical devices such as lithium ion secondary batteries, lithium ion capacitors, and electric double-layer capacitors have characteristics such as compact size, light weight, high energy-density, and the ability to be repeatedly charged and discharged, and are used in a wide variety of applications. An electrode for an electrochemical device may, for example, include a current collector and an electrode mixed material layer that is formed by drying a slurry for an electrochemical device electrode on the current collector.

In recent years, carbon nanotubes (hereinafter, also abbreviated as "CNTs") have been used as conductive materials in the formation of electrode mixed material layers. A technique in which CNTs serving as a conductive material and a dispersant are premixed to obtain a conductive material dispersion liquid for an electrochemical device and then the obtained conductive material dispersion liquid and an electrode active material are combined to produce a slurry for an electrode has been proposed with the aim of obtaining an electrode mixed material layer having CNTs dispersed well therein when CNTs are used in electrode mixed material layer formation (for example, refer to Patent Literature (PTL) 1).

CITATION LIST

Patent Literature

PTL 1: JP2018-533175A

SUMMARY

Technical Problem

However, there is demand for enhancing physical properties of an electrode formed using a conductive material dispersion liquid while also further improving device characteristics of an electrochemical device in the conventional technique described above. Specifically, there is demand for increasing flexibility and smoothness of an electrode while also causing an electrochemical device to display excellent cycle characteristics in the conventional technique described above.

Accordingly, one object of the present disclosure is to provide a conductive material dispersion liquid for an electrochemical device and a slurry for an electrochemical device electrode with which it is possible to form an electrode that has excellent flexibility and smoothness and can cause an electrochemical device to display excellent cycle characteristics.

Another object of the present disclosure is to provide an electrode for an electrochemical device that has excellent flexibility and smoothness and can cause an electrochemical device to display excellent cycle characteristics.

Yet another object of the present disclosure is to provide an electrochemical device that has excellent cycle characteristics.

Solution to Problem

The inventors conducted diligent investigation with the aim of solving the problem set forth above. The inventors discovered that with regards to a conductive material dispersion liquid containing CNTs as a conductive material and a dispersant in a dispersion medium, it is possible to obtain an electrode having both excellent flexibility and excellent smoothness by using a conductive material dispersion liquid having a Casson viscosity, a Casson yield value, and a hysteresis constant measured by a specific method that are not more than specific values, and that through this electrode, it is possible to cause an electrochemical device to display excellent cycle characteristics. In this manner, the inventors completed the present disclosure.

Specifically, the present disclosure aims to advantageously solve the problem set forth above, and a presently disclosed conductive material dispersion liquid for an electrochemical device comprises a conductive material, a dispersant, and a dispersion medium, wherein the conductive material includes one or more carbon nanotubes, and the conductive material dispersion liquid for an electrochemical device has a Casson viscosity of 30 $(Pa \cdot s)^{1/2}$ or less, a Casson yield value of 20 $Pa^{1/2}$ or less, and a hysteresis constant of 0.7 or less.

Note that the "Casson viscosity" and the "Casson yield value" referred to in the present disclosure are respectively values corresponding to A (gradient) and B (intercept) in the Casson equation: $S^{1/2} = A \times D^{1/2} + B$. Also note that in the present disclosure, the Casson viscosity A and the Casson yield value B in the Casson equation can be determined from a Casson plot indicating a relationship between the square root ($S^{1/2}$) of shear stress S and the square root ($D^{1/2}$) of shear rate D by a method described in the EXAMPLES section.

Moreover, the "hysteresis constant" referred to in the present disclosure is a value calculated by the following formula (I).

$$\text{Hysteresis constant } C = (N_1 - N_2)/N_1 \quad \text{(I)}$$

In formula (I):

$N_1$ is the viscosity (Pa·s) of the conductive material dispersion liquid for an electrochemical device at a shear rate of 10 $s^{-1}$ when viscosity is measured while increasing the shear rate from $10^{-2}$ $s^{-1}$ to $10^3$ $s^{-1}$ using a rheometer at a temperature of 25° C.; and $N_2$ is the viscosity (Pa·s) of the conductive material dispersion liquid for an electrochemical device at a shear rate of 10 $s^{-1}$ when, after measurement of $N_1$, viscosity is measured while decreasing the shear rate from $10^3$ $s^{-1}$ to $10^{-2}$ $s^{-1}$ using a rheometer at a temperature of 25° C.

By using a conductive material dispersion liquid that, in this manner, contains a conductive material including CNTs and a dispersant in a dispersion medium and that has a Casson viscosity, a Casson yield value, and a hysteresis constant that are not more than the values set forth above, it is possible to obtain an electrode having both excellent flexibility and excellent smoothness and an electrochemical device that can display excellent cycle characteristics.

In the presently disclosed conductive material dispersion liquid for an electrochemical device, the dispersant preferably includes a nitrile group-containing monomer unit. By using a polymer that includes a nitrile group-containing monomer unit as the dispersant, it is possible to further improve the flexibility and smoothness of an electrode and the cycle characteristics of an electrochemical device. In addition, low-temperature output characteristics and rate characteristics of an electrochemical device can be enhanced.

Note that when a polymer such as a dispersant is said to "include a monomer unit" in the present disclosure, this means that "a polymer obtained using that monomer includes a repeating unit derived from the monomer".

Also note that the proportional content of a repeating unit (monomer unit or subsequently described structural unit) in a polymer referred to in the present disclosure can be measured by a nuclear magnetic resonance (NMR) method such as $^1$H-NMR or $^{13}$C-NMR.

In the presently disclosed conductive material dispersion liquid for an electrochemical device, it is preferable that content of the carbon nanotubes is not less than 1.0 mass % and not more than 30.0 mass %, and content of the dispersant is not less than 0.1 mass % and not more than 3.0 mass %. When the proportions constituted by the CNTs and the dispersant in the conductive material dispersion liquid are within the ranges set forth above, it is possible to further improve the flexibility and smoothness of an electrode and the cycle characteristics of an electrochemical device. In addition, low-temperature output characteristics and rate characteristics of an electrochemical device can be enhanced.

Moreover, the present disclosure aims to advantageously solve the problem set forth above, and a presently disclosed slurry for an electrochemical device electrode comprises: any one of the conductive material dispersion liquids for an electrochemical device set forth above; and an electrode active material. By using a slurry for an electrode that contains any one of the conductive material dispersion liquids set forth above and an electrode active material, it is possible to obtain an electrode that has excellent flexibility and smoothness and to cause an electrochemical device including this electrode to display excellent cycle characteristics.

Furthermore, the present disclosure aims to advantageously solve the problem set forth above, and a presently disclosed electrode for an electrochemical device comprises an electrode mixed material layer formed using the slurry for an electrochemical device electrode set forth above. An electrode that includes an electrode mixed material layer formed using the slurry for an electrode set forth above has excellent flexibility and smoothness, and this electrode can cause an electrochemical device to display excellent cycle characteristics.

Also, the present disclosure aims to advantageously solve the problem set forth above, and a presently disclosed electrochemical device comprises the electrode for an electrochemical device set forth above. An electrochemical device that includes the electrode set forth above has excellent device characteristics such as cycle characteristics.

Advantageous Effect

According to the present disclosure, it is possible to provide a conductive material dispersion liquid for an electrochemical device and a slurry for an electrochemical device electrode with which it is possible to form an electrode that has excellent flexibility and smoothness and can cause an electrochemical device to display excellent cycle characteristics.

Moreover, according to the present disclosure, it is possible to provide an electrode for an electrochemical device that has excellent flexibility and smoothness and can cause an electrochemical device to display excellent cycle characteristics.

Furthermore, according to the present disclosure, it is possible to provide an electrochemical device that has excellent cycle characteristics.

DETAILED DESCRIPTION

The following provides a detailed description of embodiments of the present disclosure.

The presently disclosed conductive material dispersion liquid for an electrochemical device can be used as a material in production of a slurry for an electrochemical device electrode. Moreover, the presently disclosed slurry for an electrochemical device electrode is produced using the presently disclosed conductive material dispersion liquid for an electrochemical device. Furthermore, a feature of the presently disclosed electrode for an electrochemical device is that it includes an electrode mixed material layer formed using the presently disclosed slurry for an electrochemical device electrode. Also, a feature of the presently disclosed electrochemical device is that it includes the presently disclosed electrode for an electrochemical device.

(Conductive Material Dispersion Liquid for Electrochemical Device)

The presently disclosed conductive material dispersion liquid contains a conductive material, a dispersant, and a dispersion medium and may optionally contain other components. It is a requirement that at least CNTs are used as the conductive material. Note that the conductive material dispersion liquid normally does not contain an electrode active material (positive electrode active material or negative electrode active material).

Moreover, a feature of the presently disclosed conductive material dispersion liquid is that it has a Casson viscosity, a Casson yield value, and a hysteresis constant measured by a specific method that are not more than specific values. By using such a conductive material dispersion liquid, it is possible to produce an electrode that has excellent flexibility and smoothness and that can cause an electrochemical device to display excellent cycle characteristics.

<Conductive Material>

Although at least CNTs are used as the conductive material, it is also possible to use CNTs and conductive materials other than CNTs (other conductive materials) in combination.

<<Carbon Nanotubes>>

The CNTs may be single-walled carbon nanotubes or may be multi-walled carbon nanotubes. Moreover, single-walled CNTs and multi-walled CNTs may be used in combination as the CNTs.

The BET specific surface area of the CNTs is preferably 180 m$^2$/g or more, and more preferably 200 m$^2$/g or more, and is preferably 1,500 m$^2$/g or less, and more preferably 1,000 m$^2$/g or less. When the BET specific surface area of the CNTs is 180 m$^2$/g or more, cycle characteristics of an electrochemical device can be further improved while also enhancing low-temperature output characteristics and rate characteristics of the electrochemical device. On the other hand, when the BET specific surface area of the CNTs is 1,500 m$^2$/g or less, the viscosity of the conductive material dispersion liquid can be suppressed to a low level at the same solid content concentration. Consequently, the solid content concentration of the conductive material dispersion liquid can be increased, which makes it possible to increase the density of an electrode mixed material layer obtained using the conductive material dispersion liquid and to thereby further improve the flexibility of an electrode.

Note that the "BET specific surface area" referred to in the present disclosure is the nitrogen adsorption specific surface area measured by the BET method.

CNTs synthesized by a known CNT synthesis method such as arc discharge, laser ablation, or chemical vapor deposition (CVD) can be used as the CNTs without any specific limitations.

<<Other Conductive Materials>>

Any material that functions as a conductive material that can ensure electrical contact among an electrode active material in an electrode mixed material layer can be used as another conductive material without any specific limitations. Examples of other conductive materials include carbon materials other than CNTs. Examples of such carbon materials include carbon black (for example, acetylene black, Ketjenblack® (Ketjenblack is a registered trademark in Japan, other countries, or both), and furnace black), graphite, carbon flake, and carbon nanofiber. One of these carbon materials may be used individually, or two or more of these carbon materials may be used in combination.

Note that CNTs may be used by themselves as the conductive material, or CNTs and another conductive material may be used in combination as the conductive material as previously described. However, from a viewpoint of achieving the desired effects well, the proportion constituted by the CNTs among the overall conductive material when the mass of the overall conductive material is taken to be 100 mass % is preferably not less than 20 mass % and not more than 100 mass %, more preferably not less than 50 mass % and not more than 100 mass %, even more preferably not less than 80 mass % and not more than 100 mass %, and particularly preferably 100 mass % (i.e., the conductive material is particularly preferably composed of just CNTs).

<<Content of CNTs>>

Although no specific limitations are placed on the content of the CNTs in the conductive material dispersion liquid, the content of the CNTs when the mass of the overall conductive material dispersion liquid is taken to be 100 mass % is preferably 1.0 mass % or more, more preferably 2.0 mass % or more, and even more preferably 3.0 mass % or more, and is preferably 30.0 mass % or less, more preferably 15.0 mass % or less, and even more preferably 7.0 mass % or less. When the content of the CNTs in the conductive material dispersion liquid is within any of the ranges set forth above, it is possible to further improve the flexibility and smoothness of an electrode and the cycle characteristics of an electrochemical device. In addition, low-temperature output characteristics and rate characteristics of an electrochemical device can be enhanced.

<Dispersant>

The dispersant is not specifically limited so long as it is a polymer that can cause dispersion of the conductive material including CNTs described above in the dispersion medium. A polymer that includes a nitrile group-containing monomer unit is preferable as such a polymer.

<<Nitrile Group-Containing Monomer Unit>>

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio. Of these nitrile group-containing monomers, acrylonitrile is preferable.

The proportional content of nitrile group-containing monomer units in the dispersant (polymer) when all repeating units in the polymer constituting the dispersant are taken to be 100 mass % is preferably 10 mass % or more, more preferably 15 mass % or more, and even more preferably 20 mass % or more, and is preferably 50 mass % or less, more preferably 45 mass % or less, and even more preferably 40 mass % or less. When the proportional content of nitrile group-containing monomer units in the dispersant is within any of the ranges set forth above, solubility of the dispersant in the dispersion medium (for example, N-methyl-2-pyrrolidone) is sufficiently ensured, and an obtained electrode mixed material layer can be caused to closely adhere well to a current collector. Consequently, it is possible to disperse the conductive material well in the conductive material dispersion liquid and to further improve the flexibility and smoothness of an electrode and the cycle characteristics of an electrochemical device. In addition, low-temperature output characteristics and rate characteristics of an electrochemical device can be enhanced.

Examples of Polymer Including Nitrile Group-Containing Monomer Unit

The polymer including a nitrile group-containing monomer unit is preferably a polymer including a nitrile group-containing monomer unit and an alkylene structural unit or a polymer including a nitrile group-containing monomer unit and a (meth)acrylic acid ester monomer unit, for example, with a polymer including a nitrile group-containing monomer unit and an alkylene structural unit being preferable from a viewpoint of enhancing rate characteristics of an electrochemical device while also further improving cycle characteristics of the electrochemical device.

Note that the term "alkylene structural unit" as used in the present disclosure refers to a repeating unit that is composed of only an alkylene structure represented by a general formula: —$C_nH_{2n}$— (n is an integer of 2 or more).

Moreover, in the present disclosure, "(meth)acryl" is used to indicate "acryl" and/or "methacryl".

[Polymer Including Nitrile Group-Containing Monomer Unit and Alkylene Structural Unit]

This polymer includes at least an alkylene structural unit in addition to a nitrile group-containing monomer unit such as previously described and can optionally include repeating units other than the nitrile group-containing monomer unit and the alkylene structural unit (i.e., other repeating units). Moreover, the carbon number of the alkylene structural unit is preferably 4 or more (i.e., n in the preceding general formula is preferably an integer of 4 or more).

—Alkylene Structural Unit—

Although the alkylene structural unit may be linear or branched, the alkylene structural unit is preferably linear (i.e., is preferably a linear alkylene structural unit) from a viewpoint of improving rate characteristics of an electrochemical device.

No specific limitations are placed on the method by which the alkylene structural unit is introduced into the dispersant (polymer). For example, method (1) or (2) described below may be used.

(1) A method in which a polymer is produced from a monomer composition containing a conjugated diene monomer and then the polymer is hydrogenated in order to convert a conjugated diene monomer unit to an alkylene structural unit (2) A method in which a polymer is produced from a monomer composition containing a 1-olefin monomer Of these methods, method (1) is preferable in terms of ease of production of the dispersant.

The conjugated diene monomer may be a conjugated diene compound having a carbon number of 4 or more such as 1,3-butadiene, isoprene, 2,3-dimethyl-1,3-butadiene, 2-ethyl-1,3-butadiene, or 1,3-pentadiene, for example. Of these conjugated diene compounds, 1,3-butadiene is preferable. In other words, the alkylene structural unit is preferably a structural unit obtained through hydrogenation of a conjugated diene monomer unit (i.e., is preferably a hydrogenated conjugated diene unit), and is more preferably a structural unit obtained through hydrogenation of a 1,3-butadiene monomer unit (i.e., is more preferably a hydrogenated 1,3-butadiene unit).

The 1-olefin monomer may be ethylene, propylene, 1-butene, or the like, for example.

One of these conjugated diene monomers or 1-olefin monomers may be used individually, or two or more of these conjugated diene monomers or 1-olefin monomers may be used in combination in a freely selected ratio.

The proportional content of alkylene structural units in the dispersant (polymer) when all repeating units in the polymer constituting the dispersant are taken to be 100 mass % is preferably 40 mass % or more, more preferably 45 mass % or more, and even more preferably 50 mass % or more, and is preferably 90 mass % or less, more preferably 85 mass % or less, and even more preferably 80 mass % or less. When the proportional content of alkylene structural units in the dispersant is within any of the ranges set forth above, it is possible to further improve the flexibility and smoothness of an electrode and the cycle characteristics of an electrochemical device, which is presumed to be due to increased affinity between the conductive material (CNTs, etc.) and the dispersant. In addition, low-temperature output characteristics and rate characteristics of an electrochemical device can be enhanced.

Note that in a case in which the dispersant is a polymer obtained according to method (1) described above, the total proportion constituted by alkylene structural units and conjugated diene monomer units in the dispersant preferably satisfies any of the ranges set forth above.

—Other Repeating Units—

Examples of other repeating units in the polymer including a nitrile group-containing monomer unit and an alkylene structural unit include, but are not specifically limited to, an aromatic vinyl monomer unit, an acidic group-containing monomer unit, and a (meth)acrylic acid ester monomer unit. Note that the polymer including a nitrile group-containing monomer unit and an alkylene structural unit may include one type of other repeating unit or may include two or more types of other repeating units.

Examples of aromatic vinyl monomers that can form an aromatic vinyl monomer unit include styrene, α-methylstyrene, p-t-butylstyrene, butoxystyrene, vinyltoluene, chlorostyrene, and vinylnaphthalene. One aromatic vinyl monomer may be used individually, or two or more aromatic vinyl monomers may be used in combination in a freely selected ratio. Of these aromatic vinyl monomers, styrene is preferable.

Examples of acidic group-containing monomers that can form an acidic group-containing monomer unit include carboxy group-containing monomers, sulfo group-containing monomers, and phosphate group-containing monomers. One acidic group-containing monomer may be used individually, or two or more acidic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

An acid anhydride that produces a carboxy group through hydrolysis can also be used as a carboxy group-containing monomer. Of these examples, acrylic acid and methacrylic acid are preferable as carboxy group-containing monomers.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One (meth)acrylic acid ester monomer may be used individually, or two or more (meth)acrylic acid ester monomers may be used in combination in a freely selected ratio.

The proportional content of other repeating units in the polymer including a nitrile group-containing monomer unit and an alkylene structural unit when all repeating units in the polymer are taken to be 100 mass % is preferably not less than 0 mass % and not more than 30 mass %, more preferably not less than 0 mass % and not more than 20 mass %, even more preferably not less than 0 mass % and not more than 10 mass %, and particularly preferably not less than 0 mass % and not more than 5 mass %.

[Polymer Including Nitrile Group-Containing Monomer Unit and (Meth)Acrylic Acid Ester Monomer Unit]

This polymer includes at least a (meth)acrylic acid ester monomer unit in addition to a nitrile group-containing monomer unit such as previously described and can optionally include repeating units other than the nitrile group-containing monomer unit and the (meth)acrylic acid ester monomer unit (i.e., other repeating units).

Examples of (meth)acrylic acid ester monomers that can form a (meth)acrylic acid ester monomer unit include the same (meth)acrylic acid ester monomers as previously described in the "Polymer including nitrile group-containing monomer unit and alkylene structural unit" section. One (meth)acrylic acid ester monomer may be used individually, or two or more (meth)acrylic acid ester monomers may be used in combination in a freely selected ratio. Of these (meth)acrylic acid ester monomers, 2-ethylhexyl acrylate is preferable.

The proportional content of (meth)acrylic acid ester monomer units in the dispersant (polymer) when all repeating units in the polymer constituting the dispersant are taken to be 100 mass % is preferably 10 mass % or more, more preferably 20 mass % or more, and even more preferably 30 mass % or more, and is preferably 70 mass % or less, more preferably 60 mass % or less, and even more preferably 50 mass % or less.

—Other Repeating Units—

Although other repeating units in the polymer including a nitrile group-containing monomer unit and a (meth)acrylic acid ester monomer unit are not specifically limited, an aromatic vinyl monomer unit and an acidic group-containing monomer unit are preferable. The polymer including a nitrile group-containing monomer unit and a (meth)acrylic acid ester monomer unit that serves as the dispersant may include one type of other repeating unit or may include two or more types of other repeating units.

Examples of aromatic vinyl monomers that can form an aromatic vinyl monomer unit include the same aromatic vinyl monomers as previously described in the "Polymer including nitrile group-containing monomer unit and alkylene structural unit" section. One aromatic vinyl monomer may be used individually, or two or more aromatic vinyl monomers may be used in combination in a freely selected ratio. Of these aromatic vinyl monomers, styrene is preferable.

The proportional content of aromatic vinyl monomer units in the dispersant (polymer) when all repeating units in the polymer constituting the dispersant are taken to be 100 mass % is preferably 10 mass % or more, more preferably 20 mass % or more, and even more preferably 30 mass % or more, and is preferably 70 mass % or less, more preferably 60 mass % or less, and even more preferably 50 mass % or less.

Examples of acidic group-containing monomers that can form an acidic group-containing monomer unit include the same acidic group-containing monomers as previously described in the "Polymer including nitrile group-containing monomer unit and alkylene structural unit" section. One acidic group-containing monomer may be used individually, or two or more acidic group-containing monomers may be used in combination in a freely selected ratio. Of these acidic group-containing monomers, methacrylic acid is preferable.

The proportional content of acidic group-containing monomer units in the dispersant (polymer) when all repeating units in the polymer constituting the dispersant are taken to be 100 mass % is preferably 0.5 mass % or more, more preferably 1 mass % or more, and even more preferably 1.5 mass % or more, and is preferably 10 mass % or less, more preferably 7 mass % or less, and even more preferably 4 mass % or less.

<<Weight-Average Molecular Weight>>

The weight-average molecular weight of the dispersant (polymer) is preferably 10,000 or more, more preferably 15,000 or more, and even more preferably 20,000 or more, and is preferably 400,000 or less, more preferably 300,000 or less, and even more preferably 200,000 or less. When the weight-average molecular weight of the dispersant is 10,000 or more, cycle characteristics of an electrochemical device can be further improved, which is presumed to be due to elution of the dispersant into electrolyte solution being inhibited. On the other hand, when the weight-average molecular weight of the dispersant is 400,000 or less, low-temperature output characteristics and rate characteristics can be improved. In addition, the viscosity of the conductive material dispersion liquid can be suppressed to a low level at the same solid content concentration. Consequently, the solid content concentration of the conductive material dispersion liquid can be increased, which makes it possible to increase the density of an electrode mixed material layer obtained using the conductive material dispersion liquid and to thereby further improve the flexibility of an electrode.

Note that the "weight-average molecular weight" referred to in the present disclosure can be measured by a method described in the EXAMPLES section.

<<Production Method of Dispersant>>

No specific limitations are placed on the method by which the dispersant is produced. For example, the dispersant may be produced by performing polymerization of a monomer composition containing one monomer or two or more monomers in an aqueous solvent and then optionally performing hydrogenation. Note that the proportional contents of monomers in the monomer composition can be set in accordance with the desired proportional contents of repeating units (monomer units and/or structural units) in the polymer.

Although the polymerization method is not specifically limited, a method such as solution polymerization, suspension polymerization, bulk polymerization, or emulsion polymerization may be used. Moreover, any of ionic polymerization, radical polymerization, living radical polymerization, various types of condensation polymerization, addition polymerization, and so forth can be adopted as the polymerization reaction. Furthermore, a known emulsifier and/or polymerization initiator may be used in the polymerization as necessary. The hydrogenation can be performed by a known method.

<<Content of Dispersant>>

Although no specific limitations are placed on the content of the dispersant in the conductive material dispersion liquid, the content of the dispersant when the mass of the overall conductive material dispersion liquid is taken to be 100 mass % is preferably 0.1 mass % or more, more preferably 0.2 mass % or more, and even more preferably 0.5 mass % or more, and is preferably 3.0 mass % or less, more preferably 2.5 mass % or less, and even more preferably 2.0 mass % or less. When the content of the dispersant is within any of the ranges set forth above, it is possible to further improve the flexibility and smoothness of an electrode and the cycle characteristics of an electrochemical device. In addition, low-temperature output characteristics and rate characteristics of an electrochemical device can be enhanced.

<Dispersion Medium>

The dispersion medium can be water or an organic solvent, but is preferably an organic solvent. Examples of organic solvents that may be used include, but are not specifically limited to, alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide organic solvents such as N,N-dimethylformamide and N-methyl-2-pyrrolidone (NMP); and aromatic hydrocarbons such as toluene, xylene, chlorobenzene, orthodichlorobenzene, and paradichlorobenzene. One dispersion medium may be used individually, or two or more dispersion mediums may be used in combination in a freely selected ratio. From a viewpoint of dispersing the conductive material (CNTs, etc.) well in the conductive material dispersion liquid, the dispersion medium is preferably an organic solvent, and more preferably NMP.

<Other Components>

Examples of other components that can be contained in the conductive material dispersion liquid include components other than an electrode active material that are subsequently described in the "Slurry for electrochemical device electrode" section, but are not specifically limited thereto. One other component may be used individually, or two or more other components may be used in combination in a freely selected ratio.

<Casson Viscosity>

The Casson viscosity of the presently disclosed conductive material dispersion liquid is required to be 30 $(Pa \cdot s)^{1/2}$ or less as previously described, and is preferably 20 $(Pa \cdot s)^{1/2}$ or less, and more preferably 10 $(Pa \cdot s)^{1/2}$ or less. The conductive material dispersion liquid becomes excessively viscous when the Casson viscosity exceeds 30 $(Pa \cdot s)^{1/2}$. This makes it difficult to increase the solid content concentration of the conductive material dispersion liquid, and thus the density of an electrode mixed material layer obtained using the conductive material dispersion liquid cannot be increased, thereby resulting in loss of flexibility of an electrode. The lower limit for the Casson viscosity is not specifically limited so long as it is more than 0 $(Pa \cdot s)^{1/2}$, and may be 0.01 $(Pa \cdot s)^{1/2}$ or more, for example.

Although a conductive material dispersion liquid having a Casson viscosity of not more than a specific value can be produced by a method subsequently described in the "Production method of conductive material dispersion liquid" section, it is also possible to control the Casson viscosity by altering the weight-average molecular weight and chemical composition (for example, the proportional content of nitrile group-containing monomer units) of the dispersant.

<Casson Yield Value>

The Casson yield value of the presently disclosed conductive material dispersion liquid is required to be 20 $Pa^{1/2}$ or less as previously described, and is preferably 15 $Pa^{1/2}$ or less, more preferably 10 $Pa^{1/2}$ or less, and even more preferably 6 $Pa^{1/2}$ or less. The Casson yield value is a value corresponding to shear stress when the shear rate is 0, and viscosity stability of the conductive material dispersion liquid is lost when this value is large. In a situation in which a slurry for an electrode containing a conductive material dispersion liquid that has low viscosity stability is used to form an electrode mixed material layer on a current collector or the like, irregularities are formed at the surface of the mixed material layer, and electrode smoothness is lost. Moreover, an electrochemical device cannot be caused to display excellent device characteristics (particularly low-temperature output characteristics) when using an electrode that has poor smoothness. The lower limit for the Casson yield value is not specifically limited so long as it is more than 0 $Pa^{1/2}$, and may be 0.01 $Pa^{1/2}$ or more, for example.

<Hysteresis Constant>

The hysteresis constant is a value defined by the following formula (I).

$$\text{Hysteresis constant } C=(N_1-N_2)/N_1 \tag{I}$$

In formula (I):

$N_1$ is the viscosity (Pa·s) of the conductive material dispersion liquid for an electrochemical device at a shear rate of 10 $s^{-1}$ when viscosity is measured while increasing the shear rate from $10^{-2}$ $s^{-1}$ to $10^1$ $s^{-1}$ using a rheometer at a temperature of 25° C.; and $N_2$ is the viscosity (Pa·s) of the conductive material dispersion liquid for an electrochemical device at a shear rate of 10 $s^{-1}$ when, after measurement of $N_1$, viscosity is measured while decreasing the shear rate from $10^1$ $s^{-1}$ to $10^{-2}$ $s^{-1}$ using a rheometer at a temperature of 25° C.

In other words, the hysteresis constant is determined by measuring the viscosity $N_1$ of the conductive material dispersion liquid at a shear rate of 10 $s^{-1}$ in a process (first shearing treatment) in which the shear rate is increased from a low shear rate ($10^{-2}$ $s^{-1}$) to a high shear rate (10's$^{-1}$) and the viscosity $N_2$ of the conductive material dispersion liquid at a shear rate of 10 $s^{-1}$ in a process (second shearing treatment) in which the shear rate is decreased from a high shear rate (10's$^{-1}$) to a low shear rate ($10^{-2}$ $s^{-1}$) after the first shearing treatment as described above, and then calculating the degree of reduction from the viscosity $N_1$ to the viscosity $N_2$ by formula (I).

According to studies conducted by the inventors, a smaller degree of reduction of viscosity due to this shearing signifies that the conductive material dispersion liquid is resistant to shearing and does not readily undergo structural change. Moreover, a conductive material dispersion liquid that strongly exhibits this attribute enables good formation of electrical conduction paths by the conductive material when used to form an electrode mixed material layer and can cause an electrochemical device to display excellent cycle characteristics. This is presumed to be because the conductive material dispersion liquid does not readily thicken and has a low tendency for poor dispersion of the conductive material to arise.

The hysteresis constant of the presently disclosed conductive material dispersion liquid is required to be 0.7 or less as previously described, and is preferably 0.6 or less, more preferably 0.5 or less, and even more preferably 0.3 or less. Cycle characteristics of an electrochemical device deteriorate when the hysteresis constant exceeds 0.7. The lower limit for the hysteresis constant is not specifically limited so long as it is more than 0, and may be 0.01 or more, for example.

<Solid Content Concentration>

The proportion constituted by solid content among the overall conductive material dispersion liquid (i.e., the solid content concentration) in the presently disclosed conductive material dispersion liquid is preferably 1.0 mass % or more, more preferably 3.0 mass % or more, even more preferably 4.0 mass % or more, and particularly preferably 5.0 mass % or more, and is preferably 30.0 mass % or less, more preferably 15.0 mass % or less, even more preferably 10.0 mass % or less, and particularly preferably 7.0 mass % or less. When the solid content concentration of the conductive material dispersion liquid is 1.0 mass % or more, the hysteresis constant can be reduced, and cycle characteristics of an electrochemical device can be further improved. On the other hand, when the solid content concentration of the conductive material dispersion liquid is 30.0 mass % or less, the Casson viscosity and Casson yield value can be reduced, flexibility and smoothness of an electrode can be further improved, and low-temperature output characteristics and rate characteristics of an electrochemical device can be enhanced.

<Production Method of Conductive Material Dispersion Liquid>

The conductive material dispersion liquid having a Casson viscosity, a Casson yield value, and a hysteresis constant that are not more than the upper limits set forth above can be produced by a method in which mixing of components such as the above-described conductive material, dispersant, and dispersion medium is performed through a dispersing step having at least two stages (first dispersing step and second dispersing step), for example. In this method, the Casson viscosity, Casson yield value, and hysteresis constant of the conductive material dispersion liquid can be controlled through adjustment of conditions of dispersing treatment (type, rotation speed, and circumferential speed of dispersing device, time and temperature of dispersing treatment, and quantitative ratio of CNTs and dispersant during dispersing treatment) in the first dispersing step and/or the second dispersing step.

The following describes suitable conditions for controlling the Casson viscosity, Casson yield value, and hysteresis constant of a conductive material dispersion liquid to be not more than specific upper limits through a two-stage dispersing step. Note that in this configuration, the two-stage dispersing step is normally performed using different dispersing devices. By using different dispersing devices in the two-stage dispersing step, it is possible to perform dispersing treatment of a dispersion subject by different methods in an initial stage of dispersing (crude dispersing stage) and a later stage of dispersing (main dispersing stage) and to thereby easily produce a novel conductive material dispersion liquid having a Casson viscosity, a Casson yield value, and a hysteresis constant that are not more than specific upper limits. Also note that in this configuration, steps other than the first dispersing step and the second dispersing step may be performed.

A technique of altering the addition method of a dispersant or the ratio of a conductive material and a dispersant has previously been employed in order to control the state of adsorption of a dispersant to a conductive material. A technique such as described above does indeed enable control of the adsorption state in a case in which carbon black is used as a conductive material. However, the presently disclosed conductive material dispersion liquid contains CNTs as a conductive material, and thus it is important to further control multiple factors in order to control the adsorption state and also the Casson viscosity, Casson yield value, and hysteresis constant (particularly the hysteresis constant).

It should be noted that the production method of the presently disclosed conductive material dispersion liquid is not necessarily limited to this configuration.

<<First Dispersing Step>>

In the first dispersing step, a composition containing at least CNTs, a dispersant, and a dispersion medium is subjected to dispersing treatment to obtain a crude dispersion. The main object of the first dispersing step is to cause wetting (blending) of the CNTs (dispersion subject) with the dispersant and the dispersion medium.

The dispersing device that is used in the first dispersing step may be a disper blade, a Homo Mixer, a planetary mixer, a kneader, or a ball mill, for example. Moreover, the dispersing device used in the first dispersing step is preferably a disper blade or a planetary mixer, and more preferably a disper blade.

In a situation in which a disper blade is used as the dispersing device, the rotation speed is preferably 500 rpm or more, more preferably 1,000 rpm or more, and even more preferably 2,000 rpm or more, and is preferably 8,000 rpm or less, more preferably 7,000 rpm or less, and even more preferably 6,000 rpm or less.

In a situation in which a planetary mixer is used as the dispersing device, the rotation speed is preferably 5 rpm or more, more preferably 10 rpm or more, and even more preferably 30 rpm or more, and is preferably 150 rpm or less, more preferably 120 rpm or less, and even more preferably 100 rpm or less.

The dispersing treatment time in the first dispersing step is preferably 12 minutes or more, more preferably 15 minutes or more, and even more preferably 20 minutes or more, and is preferably 60 minutes or less, more preferably 50 minutes or less, and even more preferably 40 minutes or less.

From a viewpoint of controlling molecular mobility of the dispersant and the dispersion medium and also of controlling the viscosity of the dispersion system and the degree of interaction of the CNTs, dispersion medium, and dispersant, the dispersing treatment temperature in the first dispersing step is preferably 5° C. or higher, and is preferably 50° C. or lower, more preferably 45° C. or lower, even more preferably 35° C. or lower, and particularly preferably 25° C. or lower. The dispersion medium can more easily infiltrate gaps in bundles of CNTs when the dispersing treatment temperature is 5° C. or higher, whereas deterioration of the dispersant is inhibited and adsorption of the dispersant to the CNTs is facilitated when the dispersing treatment temperature is 50° C. or lower. Moreover, by keeping the dispersing treatment temperature within any of the ranges set forth above, cross-linking of the dispersant can be inhibited, and the Casson yield value of the conductive material dispersion liquid can be suitably reduced.

With regards to the ratio of the CNTs and the dispersant during dispersing treatment in the first dispersing step, the content of the dispersant in the composition that is subjected to dispersing treatment in the first dispersing step is preferably 5 parts by mass or more, and more preferably 10 parts by mass or more per 100 parts by mass of the CNTs, and is preferably 100 parts by mass or less, and more preferably 50 parts by mass or less per 100 parts by mass of the CNTs. Note that in the first dispersing step, the dispersant may be added all at once in the initial stage of dispersing treatment, or the dispersant may be split up and added. The decision as to whether to adopt single addition or split addition may be made as appropriate depending on adsorption strength of the dispersant, etc. By adopting an addition method for the dispersant that is in accordance with the adsorption strength of the dispersant in this manner, it is possible to suitably reduce the Casson yield value of the conductive material dispersion liquid.

<<Second Dispersing Step>>

In the second dispersing step, additional dispersant, or the like, is optionally added to the crude dispersion obtained in the first dispersing step and then further dispersing treatment is performed to obtain a conductive material dispersion liquid. The main object of the second dispersing step is to impart shear force or impact energy in order to disperse and disentangle the CNTs (dispersion subject).

As previously described, a different dispersing device to that used in the first dispersing step is normally used in the second dispersing step. The dispersing device used in the second dispersing step may, for example, be a disper blade, a Homo Mixer, a planetary mixer, a kneader, a ball mill, or a thin-film spin system high-speed mixer such as a FIL-MIX® (FILMIX is a registered trademark in Japan, other countries, or both). Moreover, the dispersing device used in the second dispersing step is preferably a dispersing device in which media are not used (i.e., is preferably a medialess dispersing device), and is more preferably a thin-film spin system high-speed mixer. In particular, when a dispersing device in which media are used is adopted in the second dispersing step that constitutes main dispersing, there are instances in which contact between the CNTs and the media causes damage and loss of length of the CNTs, which are tube-shaped structures, and in which rate characteristics, low-temperature output characteristics, and cycle characteristics of an electrochemical device deteriorate. In contrast, by using a medialess dispersing device such as a thin-film spin system high-speed mixer, it is possible to efficiently disentangle bundles of CNTs while suppressing damage to the CNTs and to further improve the desired effects.

In a case in which a thin-film spin system high-speed mixer is used as the dispersing device, the circumferential speed is preferably 10 m/s or more, more preferably 20 m/s or more, and even more preferably 25 m/s or more, and is preferably 45 m/s or less, more preferably 40 m/s or less, and even more preferably 35 m/s or less. When the circumferential speed is within any of the ranges set forth above, bundles can be efficiently disentangled without loss of CNT length.

The dispersing treatment time in the second dispersing step is preferably 2 minutes or more, more preferably 3 minutes or more, and even more preferably 4 minutes or more, and is preferably 20 minutes or less, more preferably 10 minutes or less, and even more preferably 7 minutes or less. When the dispersing treatment time is within any of the ranges set forth above, homogenization of the conductive material dispersion liquid is promoted, and reduction of viscosity and improvement of viscosity stability are possible.

The ratio of the CNTs and the dispersant during dispersing treatment in the second dispersing step is normally the same as in the obtained conductive material dispersion liquid. Note that in the second dispersing step, the dispersant may be added all at once in an initial stage of the dispersing treatment, or the dispersant may be split up and added in order to promote efficient adsorption of the dispersant at interfaces newly formed through progression of dispersion and disentanglement of the CNTs.

(Slurry for Electrochemical Device Electrode)

The presently disclosed slurry for an electrode contains the conductive material dispersion liquid set forth above and an electrode active material, and may contain optional components such as a binder as necessary. In other words, the presently disclosed slurry for an electrode contains a conductive material including one or more CNTs, a dispersant, and a dispersion medium, and may contain optional components such as a binder as necessary.

An electrode that includes an electrode mixed material layer formed from a slurry for an electrode containing the conductive material dispersion liquid set forth above in this manner has excellent flexibility and smoothness, and this electrode makes it possible to cause an electrochemical device to display excellent cycle characteristics.

<Electrode Active Material>

Known electrode active materials can be used as the electrode active material (positive electrode active material or negative electrode active material) contained in the slurry for an electrode without any specific limitations.

A positive electrode active material that is used in a lithium ion secondary battery, for example, may be a metal oxide containing lithium (Li), but is not specifically limited thereto. Moreover, the positive electrode active material is preferably a positive electrode active material that contains one or more selected from the group consisting of cobalt (Co), nickel (Ni), manganese (Mn), and iron (Fe) in addition to lithium (Li). Examples of such positive electrode active materials include lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium manganese phosphate ($LiMnPO_4$), olivine-type lithium iron phosphate ($LiFePO_4$), a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$. Note that one positive electrode active material may be used individually, or two or more positive electrode active materials may be used in combination in a freely selected ratio.

Also note that the particle diameter of the electrode active material is not specifically limited and may be the same as that of a conventionally used electrode active material.

The amount of the electrode active material in the slurry for an electrode is also not specifically limited and can be set within a range that is conventionally adopted.

<Optional Components>

Examples of optional components that can be contained in the slurry for an electrode include binders, viscosity modifiers, reinforcing materials, antioxidants, and additives for electrolyte solution having a function of inhibiting electrolyte solution decomposition. One of these optional components may be used individually, or two or more of these optional components may be used in combination in a freely selected ratio.

Of the optional components described above, the inclusion of a binder in the slurry for an electrode is preferable from a viewpoint of causing an obtained electrode mixed material layer to closely adhere well to a current collector.

<<Binder>>

The binder is not specifically limited but may preferably be polyacrylonitrile (PAN), polyvinyl alcohol (PVOH), or a fluorine-containing resin such as polyvinylidene fluoride (PVDF), and more preferably be a fluorine-containing resin or PAN, for example.

The amount of the binder in the slurry for an electrode is not specifically limited and can be set within a range that is conventionally adopted.

<Production Method of Slurry for Electrode>

Mixing of the above-described components to obtain the slurry for an electrode can be performed using a typical mixing device without any specific limitations on the mixing method.

(Electrode for Electrochemical Device)

The presently disclosed electrode includes an electrode mixed material layer obtained using the presently disclosed slurry for an electrode set forth above. More specifically, the presently disclosed electrode normally includes this electrode mixed material layer on a current collector. The electrode mixed material layer contains an electrode active material, CNTs, and a dispersant, and may optionally contain a binder, etc. The presently disclosed electrode has excellent flexibility and smoothness and can cause an electrochemical device to display excellent cycle characteristics as a result of including an electrode mixed material layer that is formed using the presently disclosed slurry for an electrode set forth above.

<Current Collector>

The current collector is formed of a material having electrical conductivity and electrochemical durability. A known current collector can be used as the current collector without any specific limitations. For example, a current collector formed of aluminum or an aluminum alloy can be used as a current collector that is included in a positive electrode of a lithium ion secondary battery. Moreover, aluminum and an aluminum alloy may be used in combination, or different types of aluminum alloys may be used in combination. Aluminum and aluminum alloys make excellent current collector materials due to having heat resistance and being electrochemically stable.

<Production Method of Electrode>

No specific limitations are placed on the method by which the presently disclosed electrode is produced. For example, the presently disclosed electrode can be produced by applying the presently disclosed slurry for an electrode set forth above onto at least one side of the current collector and then drying the slurry for an electrode to form an electrode mixed material layer. In more detail, this production method includes a step of applying the slurry for an electrode onto at least one side of the current collector (application step) and a step of drying the slurry for an electrode that has been applied onto at least one side of the current collector to form an electrode mixed material layer on the current collector (drying step).

<<Application Step>>

The method by which the slurry for an electrode is applied onto the current collector is not specifically limited and may be a commonly known method. Specific examples of application methods that can be used include doctor blading, dip coating, reverse roll coating, direct roll coating, gravure coating, extrusion coating, and brush coating. In the application, the slurry for an electrode may be applied onto just one side of the current collector or may be applied onto both sides of the current collector. The thickness of the slurry coating on the current collector after application but before drying may be set as appropriate in accordance with the thickness of the electrode mixed material layer to be obtained after drying.

<<Drying Step>>

The slurry for an electrode on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry for an electrode on the current collector in this manner, an electrode mixed material layer can be formed on the current collector to thereby provide an electrode that includes the current collector and the electrode mixed material layer.

After the drying step, the electrode mixed material layer may be further subjected to a pressing process, such as mold pressing or roll pressing. This pressing process enables good close adherence of the electrode mixed material layer to the current collector.

In a case in which the electrode mixed material layer contains a curable polymer, this polymer may be cured after the electrode mixed material layer has been formed.

(Electrochemical Device)

The presently disclosed electrochemical device includes the presently disclosed electrode set forth above. Moreover, the presently disclosed electrochemical device has excellent cycle characteristics as a result of including the presently disclosed electrode. Note that the presently disclosed electrochemical device may be a non-aqueous secondary battery, for example, and is preferably a lithium ion secondary battery.

The following describes configuration of a lithium ion secondary battery as one example of the presently disclosed electrochemical device. This lithium ion secondary battery includes a positive electrode, a negative electrode, an electrolyte solution, and a separator. At least one of the positive electrode and the negative electrode is the presently disclosed electrode. In other words, the lithium ion secondary battery may be a lithium ion secondary battery in which the positive electrode is the presently disclosed electrode and the negative electrode is an electrode other than the presently disclosed electrode, may be a lithium ion secondary battery in which the positive electrode is an electrode other than the presently disclosed electrode and the negative electrode is the presently disclosed electrode, or may be a lithium ion secondary battery in which the positive electrode and the negative electrode are both the presently disclosed electrode.

<Electrode Other than Presently Disclosed Electrode>

Any known electrode can be used without any specific limitations as an electrode that does not correspond to the presently disclosed electrode.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution can be adjusted as appropriate and may preferably be set as 0.5 mass % to 15 mass %, more preferably as 2 mass % to 13 mass %, and even more preferably as 5 mass % to 10 mass %, for example. Known additives such as fluoroethylene carbonate and ethyl methyl sulfone, for example, may be added to the electrolyte solution.

<Separator>

Examples of the separator include, but are not specifically limited to, separators described in JP2012-204303A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Lithium Ion Secondary Battery>

The lithium ion secondary battery according to the present disclosure can be produced by, for example, stacking the positive electrode and the negative electrode with the separator in-between, performing rolling, folding, or the like of the resultant laminate, as necessary, in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

Examples

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Furthermore, in the case of a polymer that is a hydrogenated polymer obtained through hydrogenation of a polymerized product including conjugated diene monomer units, the total proportional content of non-hydrogenated conjugated diene monomer units and alkylene structural units that are hydrogenated conjugated diene monomer units in the hydrogenated polymer is the same as the ratio (charging ratio) of a conjugated diene monomer among all monomers used in polymerization of the polymerized product.

In the examples and comparative examples, the following methods were used to evaluate the weight-average molecular weight of a dispersant, the Casson viscosity, Casson yield value, and hysteresis constant of a conductive material dispersion liquid, the smoothness and flexibility of a positive electrode, and the low-temperature output characteristics, rate characteristics, and cycle characteristics of a lithium ion secondary battery.

<Weight-Average Molecular Weight>

The weight-average molecular weight (Mw) of a dispersant (polymer) was measured by gel permeation chromatography (GPC) under the following measurement conditions using LiBr-dimethylformamide (DMF) solution of 10 mM in concentration.

Separation column: Shodex KD-806M (produced by Showa Denko K.K.)
Detector: Differential refractive index detector RID-10A (produced by Shimadzu Corporation)
Flow rate of eluent: 0.3 mL/min
Column temperature: 40° C.
Standard polymer: TSK standard polystyrene (produced by Tosoh Corporation)

<Casson Viscosity, Casson Yield Value, and Hysteresis Constant>

With respect to a produced conductive material dispersion liquid, a rheometer (produced by Anton Paar; product name: MCR 302) was used to measure force generated for turning a rotating plate at a temperature of 25° C. with a range of $10^{-2}$ $s^{-1}$ to $10^3$ $s^{-1}$ set for the shear rate, and the complex elastic modulus was measured for the first time (first shearing treatment). Thereafter, the same rheometer as in the first shearing treatment was used to measure force generated for turning the rotating plate at a temperature of 25° C. with a range of $10^3$ $s^{-1}$ to $10^{-2}$ $s^{-1}$ set for the shear rate, and the complex elastic modulus was measured for the second time (second shearing treatment).

A Casson plot with the square root ($D^{1/2}$) of the shear rate D as the X axis and the square root ($S^{1/2}$) of the shear stress S as the Y axis was prepared for measurement data obtained for the shear stress (Pa) relative to the shear rate D ($s^{-1}$) of the complex elastic modulus for the first time. The Casson viscosity was taken to be A (gradient) and the Casson yield value was taken to be B in $S^{1/2}=A \times D^{1/2}+B$ obtained through linear regression of the plot in a range in which the shear rate D was $10^2$ $s^{-1}$ to $10^3$ $s^{-1}$.

In addition, a hysteresis constant C was calculated from the viscosity $N_1$(Pa·s) at a shear rate of 10 $s^{-1}$ in the first shearing treatment and the viscosity $N_2$ (Pa·s) at a shear rate of 10 $s^{-1}$ in the second shearing treatment by the following formula (I).

$$\text{Hysteresis constant } C=(N_1-N_2)/N_1 \quad (I)$$

<Smoothness>

The surface roughness Ra of a positive electrode mixed material layer included in a produced positive electrode was measured by pasting the positive electrode mixed material layer to slide glass, setting this positive electrode mixed material layer in a Nanoscale Hybrid Microscope (produced by Keyence Corporation; product name: VN-8010), and using the Nanoscale Hybrid Microscope to measure the surface roughness Ra from a roughness curve at ×100 magnification and a temperature of 25° C. The surface roughness Ra was then evaluated by the following standard. A smaller surface roughness Ra indicates that the positive electrode has better smoothness.

A: Surface roughness Ra of 1 μm or less
B: Surface roughness Ra of more than 1 μm and not more than 3 μm
C: Surface roughness Ra of more than 3 μm and not more than 5 μm
D: Surface roughness Ra of more than 5 μm <Flexibility>

A cylindrical rod made of SUS was placed on the positive electrode mixed material layer-side of a produced positive electrode, and the positive electrode was wound around the cylindrical rod. This was performed using SUS cylindrical rods of different diameters. The occurrence of cracking of the positive electrode mixed material layer was visually evaluated. A smaller diameter indicates that the positive electrode mixed material layer and the positive electrode have better flexibility.

A: Cracking does not occur with rod of 2.0 mm in diameter
B: Cracking does not occur with rod of 2.5 mm in diameter
C: Cracking does not occur with rod of 3.0 mm in diameter
D: Cracking does not occur with rod of 3.5 mm in diameter <Low-Temperature Output Characteristics>

A produced lithium ion secondary battery was left at rest at a temperature of 25° C. for 5 hours after injection of electrolyte solution. Next, a charging operation was performed at a charge rate of 0.1 C for 5 hours in a 25° C. environment, and the voltage V0 after this charging operation was measured.

A discharging operation was subsequently performed at a discharge rate of 1 C in a −10° C. environment, and the voltage V1 at 15 seconds after the start of discharge was measured. The voltage change $\Delta V$ was calculated by a formula: $\Delta V = V0 - V1$. A smaller value for the voltage change $\Delta V$ indicates that the lithium ion secondary battery has better low-temperature output characteristics.

A: Voltage change $\Delta V$ of less than 350 mV
B: Voltage change $\Delta V$ of not less than 350 mV and less than 450 mV
C: Voltage change $\Delta V$ of not less than 450 mV and less than 550 mV
D: Voltage change $\Delta V$ of 550 mV or more <Rate Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged by a 0.2 C constant-current method (upper limit cell voltage 4.20 V) and was then CC discharged to 3.00 V by a 0.2 C constant-current method. This charging and discharging at 0.2 C was repeated three times.

Next, the lithium ion secondary battery was charged to 4.2 V by a 0.1 C constant-current method and was then discharged to 3.0 V at 0.1 C in an environment having a temperature of 25° C. in order to determine the 0.1 C discharge capacity. In addition, the lithium ion secondary battery was charged to 4.2 V at 0.1 C and was then discharged to 3.0 V at 1 C in order to determine the 1 C discharge capacity. These measurements were performed for 10 produced lithium ion secondary battery cells, and average values of the measured values were taken to be the 0.1 C discharge capacity (a) and the 1 C discharge capacity (b). An electric capacity ratio was calculated $(=b/a \times 100(\%))$ and was evaluated by the following standard. A larger value for the electric capacity ratio indicates that the lithium ion secondary battery has better rate characteristics.

A: Electric capacity ratio of 85% or more
B: Electric capacity ratio of not less than 75% and less than 85%
C: Electric capacity ratio of not less than 60% and less than 75%
D: Electric capacity ratio of less than 60%

<Cycle Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged by a 0.2 C constant-current method (upper limit cell voltage 4.20 V) and was then CC discharged to 3.00 V by a 0.2 C constant-current method. This charging and discharging at 0.2 C was repeated three times.

Next, the lithium ion secondary battery was subjected to 100 cycles of a charge/discharge operation with a cell voltage of 4.20 V to 3.00 V and a charge/discharge rate of 1.0 C in an environment having a temperature of 25° C. The discharge capacity of the $1^{st}$ cycle was defined as X1, and the discharge capacity of the $100^{th}$ cycle was defined as X2. The discharge capacity X1 and the discharge capacity X2 were used to calculate a capacity maintenance rate $(=(X2/X1) \times 100(\%))$, which was then evaluated by the following standard. A larger value for the capacity maintenance rate indicates that the lithium ion secondary battery has better cycle characteristics.

A: Capacity maintenance rate of 93% or more
B: Capacity maintenance rate of not less than 88% and less than 93%
C: Capacity maintenance rate of not less than 83% and less than 88%
D: Capacity maintenance rate of less than 83%

Example 1

<Production of dispersant (HNBR-1)>

A reactor having an internal capacity of 10 L was charged with 100 parts of deionized water and 35 parts of acrylonitrile and 65 parts of 1,3-butadiene as monomers, and then 2 parts of potassium oleate as an emulsifier, 0.1 parts of potassium phosphate as a stabilizer, and 0.7 parts of tert-dodecyl mercaptan (TDM) as a molecular weight modifier were further added, and emulsion polymerization was performed at 30° C. in the presence of 0.35 parts of potassium persulfate as a polymerization initiator so as to copolymerize the 1,3-butadiene and acrylonitrile.

At the point at which the polymerization conversion rate reached 90%, 0.2 parts of hydroxylamine sulfate was added per 100 parts of monomer to terminate polymerization. Next, heating was performed, steam distillation was performed at approximately 70° C. under reduced pressure to recover residual monomer, and then 2 parts of an alkylated phenol was added as an antioxidant to yield a water dispersion of a polymer.

Next, 400 mL (total solid content: 48 g) of the obtained water dispersion of the polymer was loaded into a 1 L autoclave equipped with a stirrer, and nitrogen gas was passed for 10 minutes so as to remove dissolved oxygen in the water dispersion of the polymer. Thereafter, 50 mg of palladium acetate as a hydrogenation reaction catalyst was dissolved in 180 mL of water to which nitric acid had been added in an amount of 4 molar equivalents relative to the Pd, and was then added into the autoclave. Purging of the system with hydrogen gas was performed twice, and then the contents of the autoclave were heated to 50° C. in a state in which the pressure was raised to 3 MPa (gauge pressure) with hydrogen gas, and a hydrogenation reaction was carried out for 6 hours.

Thereafter, the contents were restored to normal temperature, the system was converted to a nitrogen atmosphere, and then an evaporator was used to perform concentrating to a solid content concentration of 40% to yield a water dispersion of hydrogenated nitrile rubber (HNBR-1).

Next, 200 parts of NMP was added to 100 parts of this water dispersion, water and residual monomer were completely evaporated under reduced pressure, and then NMP was also evaporated to yield an NMP solution of HNBR-1 (solid content concentration: 8%). The weight-average molecular weight of the obtained HNBR-1 was measured. The result is shown in Table 1. Note that the weight-average molecular weight was "130,000", but is denoted as "13" in Table 1 with "$\times 10^4$" omitted.

<Production of Conductive Material Dispersion Liquid (Production Method: A-1)>

Dispersing treatment of 5 parts of multi-walled carbon nanotubes (BET specific surface area: 250 m$^2$/g) as a conductive material, 12.5 parts (equivalent to 1 part as solid content) of the NMP solution of HNBR-1, and 82.5 parts of NMP was performed at a rotation speed of 3,000 rpm for 30 minutes using a disper blade while maintaining a temperature of 25° C. or lower (first dispersing step). Next, dispersing treatment was performed at a circumferential speed of 30 m/s for 5 minutes using a thin-film spin system high-speed mixer (PRIMIX Corporation; product name: FILMIX, model 56-50) to produce a conductive material dispersion liquid (second dispersing step). The Casson viscosity, Casson yield value, and hysteresis constant of this conductive material dispersion liquid were evaluated. The results are shown in Table 1.

<Production of Slurry for Positive Electrode>

A slurry for a positive electrode was produced by adding together 98.0 parts of a ternary active material having a layered structure (LiNi$_{0.6}$Co$_{0.2}$Mn$_{0.2}$O$_2$; average particle diameter: 10 μm) as a positive electrode active material, 1.0 parts of polyvinylidene fluoride as a binder, 1.0 parts (in terms of solid content) of the conductive material dispersion liquid, and NMP and performing mixing thereof (60 rpm, 30 minutes) in a planetary mixer. Note that the additive amount of NMP was adjusted such that the viscosity of the obtained slurry for a positive electrode (measured by single cylinder rotational viscometer in accordance with JIS Z8803:1991; temperature: 25° C.; rotation speed: 60 rpm) was within a range of 4,000 mPa·s to 5,000 mPa·s.

<Production of Positive Electrode>

Aluminum foil of 20 μm in thickness was prepared as a current collector. The slurry for a positive electrode was applied onto the aluminum foil by a comma coater such as to have a coating weight after drying of 20 mg/cm$^2$, was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including a positive electrode mixed material layer of 3.2 g/cm$^3$ in density and aluminum foil. This sheet-shaped positive electrode was cut to 48.0 mm in width and 47 cm in length to obtain a positive electrode for a lithium ion secondary battery. Flexibility and smoothness of this positive electrode were evaluated. The results are shown in Table 1.

<Production of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the polymerization reaction and yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode.

Next, 48.75 parts of artificial graphite and 48.75 parts of natural graphite as negative electrode active materials and 1 part (in terms of solid content) of carboxymethyl cellulose as a thickener were loaded into a planetary mixer. These materials were diluted to a solid content concentration of 60% with deionized water and were subsequently kneaded at a rotation speed of 45 rpm for 60 minutes. Thereafter, 1.5 parts in terms of solid content of the water dispersion containing the binder for a negative electrode obtained as described above was added and was kneaded therewith at a rotation speed of 40 rpm for 40 minutes. Deionized water was added to adjust the viscosity to 3,000±500 mPa·s (measured by B-type viscometer at 25° C. and 60 rpm) and thereby produce a slurry for a negative electrode.

The slurry for a negative electrode was applied onto the surface of copper foil of 15 μm in thickness serving as a current collector using a comma coater such as to have a coating weight of 10±0.5 mg/cm$^2$. The copper foil with the slurry composition for a negative electrode mixed material layer applied thereon was subsequently conveyed inside an oven having a temperature of 80° C. for 2 minutes and an oven having a temperature of 110° C. for 2 minutes at a speed of 400 mm/min so as to dry the slurry for a negative electrode on the copper foil and thereby obtain a negative electrode web having a negative electrode mixed material layer formed on the current collector.

This negative electrode web was rolled by roll pressing to produce a sheet-shaped negative electrode including a negative electrode mixed material layer of 1.6 g/cm$^3$ in density and copper foil. The sheet-shaped negative electrode was cut to 50.0 mm in width and 52 cm in length to obtain a negative electrode for a lithium ion secondary battery.

<Production of Lithium Ion Secondary Battery>

The positive electrode for a lithium ion secondary battery and negative electrode for a lithium ion secondary battery were wound up with the electrode mixed material layers thereof facing each other and with a separator (microporous membrane made of polyethylene) of 15 μm in thickness in-between using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis and the minor axis (major axis/minor axis) was 7.7.

In addition, a LiPF$_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) was prepared as an electrolyte solution.

The compressed roll was subsequently enclosed in a laminate case made of aluminum together with 3.2 g of the electrolyte solution. A nickel lead was connected to a specific position on the negative electrode, an aluminum lead was connected to a specific position on the positive electrode, and then an opening of the case was heat sealed to obtain a lithium ion secondary battery. This lithium ion secondary battery had a pouch shape of 35 mm in width, 60 mm in height, and 5 mm in thickness. The nominal capacity of the battery was 700 mAh.

Low-temperature output characteristics, rate characteristics, and cycle characteristics were evaluated for the obtained lithium ion secondary battery. The results are shown in Table 1.

Example 2

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 1.

<Production of Conductive Material Dispersion Liquid (Production Method: B-2)>

Dispersing treatment of 5 parts of multi-walled carbon nanotubes (BET specific surface area: 250 m$^2$/g) as a conductive material, 12.5 parts (equivalent to 1 part as solid content) of the NMP solution of HNBR-1, and 82.5 parts of NMP was performed at a rotation speed of 60 rpm for 30 minutes using a planetary mixer while maintaining a temperature of 45° C. (first dispersing step). Next, dispersing treatment was performed at a circumferential speed of 30 m/s for 5 minutes using a thin-film spin system high-speed mixer (PRIMIX Corporation; product name: FILMIX, model 56-50) to produce a conductive material dispersion liquid (second dispersing step).

Example 3

A slurry for a positive electrode, a positive electrode, a negative electrode, and a lithium ion secondary battery were produced and various evaluations were performed in the same way as in Example 1 with the exception that a dispersant (HNBR-2) and a conductive material dispersion liquid produced as described below were used. The results are shown in Table 1.

<Production of Dispersant (HNBR-2)>

An NMP solution of HNBR-2 (solid content concentration: 8%) was obtained in the same way as HNBR-1 in Example 1 with the exception that the amount of TDM that was used was changed to 0.4 parts.

<Production of Conductive Material Dispersion Liquid (Production Method: B-3)>

Dispersing treatment of 5 parts of multi-walled carbon nanotubes (BET specific surface area: 250 m$^2$/g) as a conductive material, 6.25 parts (equivalent to 0.5 parts as solid content) of the NMP solution of HNBR-2, and 82.5 parts of NMP was performed at a rotation speed of 60 rpm for 30 minutes using a planetary mixer while maintaining a temperature of 25° C. or lower (first dispersing step). Next, a further 6.25 parts (equivalent to 0.5 parts as solid content) of the NMP solution of HNBR-2 was added to the composition obtained after the first dispersing step, and then dispersing treatment was performed at a circumferential speed of 30 m/s for 5 minutes using a thin-film spin system high-speed mixer (PRIMIX Corporation; product name: FILMIX, model 56-50) to produce a conductive material dispersion liquid (second dispersing step).

Example 4

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 1.

<Production of Conductive Material Dispersion Liquid (Production Method: A-3)>

A conductive material dispersion liquid was produced in the same way as in production method A-1 in Example 1 with the exception that the circumferential speed of the thin-film spin system high-speed mixer in the second dispersing step was changed to 20 m/s.

Example 5

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 1.

<Production of Conductive Material Dispersion Liquid (Production Method: A-4)>

A conductive material dispersion liquid was produced in the same way as in production method A-1 in Example 1 with the exception that the circumferential speed of the thin-film spin system high-speed mixer in the second dispersing step was changed to 40 m/s.

Example 6

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 1.

<Production of Conductive Material Dispersion Liquid (Production Method: A-5)>

A conductive material dispersion liquid was produced in the same way as in production method A-1 in Example 1 with the exception that the dispersing treatment time by the thin-film spin system high-speed mixer in the second dispersing step was changed to 3 minutes.

Example 7

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 1.
<Production of Conductive Material Dispersion Liquid (Production Method: A-6)>

A conductive material dispersion liquid was produced in the same way as in production method A-1 in Example 1 with the exception that the dispersing treatment time by the thin-film spin system high-speed mixer in the second dispersing step was changed to 10 minutes.

Example 8

A conductive material dispersion liquid, a slurry for a positive electrode, a positive electrode, a negative electrode, and a lithium ion secondary battery were produced and various evaluations were performed in the same way as in Example 1 with the exception that a dispersant (ACL) produced as described below was used. The results are shown in Table 1.
<Production of Dispersant (ACL)>

An autoclave equipped with a stirrer was charged with 164 parts of deionized water, 35 parts of 2-ethylhexyl acrylate, 32 parts of styrene, 30 parts of acrylonitrile, 3 parts of methacrylic acid, 0.3 parts of potassium persulfate as a polymerization initiator, 1.2 parts of sodium polyoxyethylene alkyl ether sulfate as an emulsifier, and 0.6 parts of TDM as a molecular weight modifier. These materials were thoroughly stirred and were then heated to 70° C. for 3 hours and to 80° C. for 2 hours in order to perform polymerization and thereby yield a water dispersion of an acrylic polymer (ACL). Note that the solid content concentration of this water dispersion was 37.3%, and the polymerization conversion rate determined from the solid content concentration was 96%.

Next, 200 parts of NMP was added to 100 parts of this water dispersion, water and residual monomer were completely evaporated under reduced pressure, and then NMP was also evaporated to yield an NMP solution of ACL (solid content concentration: 8%).

Example 9

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 1.
<Production of Conductive Material Dispersion Liquid (Production Method: C-2)>

Dispersing treatment of 5 parts of multi-walled carbon nanotubes (BET specific surface area: 250 m²/g) as a conductive material, 6.25 parts (equivalent to 0.5 parts as solid content) of the NMP solution of HNBR-1, and 82.5 parts of NMP was performed at a rotation speed of 3,000 rpm for 30 minutes using a disper blade while maintaining a temperature of 25° C. or lower (first dispersing step).

Next, a further 6.25 parts (equivalent to 0.5 parts as solid content) of the NMP solution of HNBR-1 was added to the composition obtained after the first dispersing step, and then a bead mill (produced by Ashizawa Finetech Ltd.; product name: LMZ015) was used to perform 20 minutes of mixing at a circumferential speed of 12 m/s with zirconia beads of 1.5 mm in diameter such that the apparent filling rate was 50 volume %. Next, 20 minutes of mixing was performed at a circumferential speed of 8 m/s with zirconia beads of 0.8 mm in diameter such that the apparent filling rate was 50 volume %. In addition, 20 minutes of mixing was performed at a circumferential speed of 12 m/s with zirconia beads of 0.8 mm in diameter such that the apparent filling rate was 80 volume % to produce a conductive material dispersion liquid (second dispersing step).

Comparative Example 1

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 2.
<Production of Conductive Material Dispersion Liquid (Production Method: A-2)>

Dispersing treatment of 5 parts of multi-walled carbon nanotubes (BET specific surface area: 250 m²/g) as a conductive material, 6.25 parts (equivalent to 0.5 parts as solid content) of the NMP solution of HNBR-1, and 82.5 parts of NMP was performed at a rotation speed of 3,000 rpm for 30 minutes using a disper blade while maintaining a temperature of 25° C. or lower (first dispersing step). A further 6.25 parts (equivalent to 0.5 parts as solid content) of the NMP solution of HNBR-1 was added to the composition obtained after the first dispersing step, and then dispersing treatment was performed at a circumferential speed of 30 m/s for 5 minutes using a thin-film spin system high-speed mixer (PRIMIX Corporation; product name: FILMIX, model 56-50) to produce a conductive material dispersion liquid (second dispersing step).

Comparative Example 2

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 2.
<Production of Conductive Material Dispersion Liquid (Production Method: B-1)>

Dispersing treatment of 5 parts of multi-walled carbon nanotubes (BET specific surface area: 250 m²/g) as a conductive material, 12.5 parts (equivalent to 1 part as solid content) of the NMP solution of HNBR-1, and 82.5 parts of NMP was performed at a rotation speed of 60 rpm for 30 minutes using a planetary mixer while maintaining a temperature of 25° C. or lower (first dispersing step). Next, dispersing treatment was performed at a circumferential speed of 30 m/s for 5 minutes using a thin-film spin system high-speed mixer (PRIMIX Corporation; product name: FILMIX, model 56-50) to produce a conductive material dispersion liquid (second dispersing step).

Comparative Example 3

A conductive material dispersion liquid, a slurry for a positive electrode, a positive electrode, a negative electrode, and a lithium ion secondary battery were produced and various evaluations were performed in the same way as in Comparative Example 2 with the exception that HNBR-2 produced in the same way as in Example 3 was used instead of HNBR-1 in production of the conductive material dispersion liquid. The results are shown in Table 2.

Comparative Example 4

A conductive material dispersion liquid, a slurry for a positive electrode, a positive electrode, a negative electrode, and a lithium ion secondary battery were produced and various evaluations were performed in the same way as in Comparative Example 1 with the exception that HNBR-2 produced in the same way as in Example 3 was used instead of HNBR-1 in production of the conductive material dispersion liquid. The results are shown in Table 2.

Comparative Example 5

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 2.
<Production of Conductive Material Dispersion Liquid (Production Method: C-1)>

Dispersing treatment of 5 parts of multi-walled carbon nanotubes (BET specific surface area: 250 m$^2$/g) as a conductive material, 12.5 parts (equivalent to 1 part as solid content) of the NMP solution of HNBR-1, and 82.5 parts of NMP was performed at a rotation speed of 3,000 rpm for 30 minutes using a disper blade while maintaining a temperature of 25° C. or lower (first dispersing step).

Next, a bead mill (produced by Ashizawa Finetech Ltd.; product name: LMZ015) was used to mix the composition obtained after the first dispersing step at a circumferential speed of 8 m/s for 1 hour with zirconia beads of 1.25 mm in diameter such that the apparent filling rate was 80 volume % to produce a conductive material dispersion liquid (second dispersing step).

Comparative Example 6

A dispersant (HNBR-2), a slurry for a positive electrode, a positive electrode, a negative electrode, and a lithium ion secondary battery were produced and various evaluations were performed in the same way as in Example 3 with the exception that a conductive material dispersion liquid produced as described below was used. The results are shown in Table 2.
<Production of Conductive Material Dispersion Liquid (Production Method: C-3)>

Dispersing treatment of 5 parts of multi-walled carbon nanotubes (BET specific surface area: 250 m$^2$/g) as a conductive material, 6.25 parts (equivalent to 0.5 parts as solid content) of the NMP solution of HNBR-2, and 82.5 parts of NMP was performed at a rotation speed of 60 rpm for 30 minutes using a planetary mixer while maintaining a temperature of 25° C. or lower (first dispersing step).

Next, a further 6.25 parts (equivalent to 0.5 parts as solid content) of the NMP solution of HNBR-2 was added to the composition obtained after the first dispersing step, and then mixing was performed at a circumferential speed of 8 m/s for 20 minutes using a bead mill (produced by Ashizawa Finetech Ltd.; product name: LMZ015) with zirconia beads of 1.25 mm in diameter such that the apparent filling rate was 80 volume % to produce a conductive material dispersion liquid (second dispersing step).

Comparative Example 7

A slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 2.
<Production of Conductive Material Dispersion Liquid (Production Method: A-7)>

An NMP solution (solid content concentration: 8%) of polyvinylpyrrolidone (produced by Tokyo Chemical Industry Co., Ltd.; product name: PVP K15) was prepared.

Dispersing treatment of 4 parts of multi-walled carbon nanotubes (BET specific surface area: 250 m$^2$/g) as a conductive material, 12.5 parts (equivalent to 1 part as solid content) of the NMP solution of PVP, and 83.5 parts of NMP was performed at a rotation speed of 3,000 rpm for 30 minutes using a disper blade while maintaining a temperature of 25° C. or lower (first dispersing step). Next, dispersing treatment was performed at a circumferential speed of 40 m/s for 1 minute using a thin-film spin system high-speed mixer (PRIMIX Corporation; product name: FILMIX, model 56-50) to produce a conductive material dispersion liquid (second dispersing step).

Comparative Example 8

A dispersant (HNBR-1), a slurry for a positive electrode, a positive electrode, a negative electrode, and a lithium ion secondary battery were produced and various evaluations were performed in the same way as in Example 1 with the exception that a conductive material dispersion liquid produced as described below was used. The results are shown in Table 2.
<Production of Conductive Material Dispersion Liquid (Production Method: A-8)>

Dispersing treatment of 5 parts of multi-walled carbon nanotubes (BET specific surface area: 250 m$^2$/g) as a conductive material, 12.5 parts (equivalent to 1 part as solid content) of the NMP solution of HNBR-1 and 82.5 parts of NMP was performed at a rotation speed of 3,000 rpm for 30 minutes using a disper blade while maintaining a temperature of 45° C. (first dispersing step). Next, dispersing treatment was performed at a circumferential speed of 50 m/s for 20 minutes using a thin-film spin system high-speed mixer (PRIMIX Corporation; product name: FILMIX, model 56-50) to produce a conductive material dispersion liquid (second dispersing step).

Comparative Example 9

A dispersant (HNBR-2), a slurry for a positive electrode, a positive electrode, a negative electrode, and a lithium ion secondary battery were produced and various evaluations were performed in the same way as in Example 3 with the exception that a conductive material dispersion liquid produced as described below was used. The results are shown in Table 2.
<Production of Conductive Material Dispersion Liquid (Production Method: C-1)>

Dispersing treatment of 2 parts of multi-walled carbon nanotubes (BET specific surface area: 250 m$^2$/g) as a conductive material, 5 parts (equivalent to 0.4 parts as solid content) of the NMP solution of HNBR-2, and 93 parts of NMP was performed at a rotation speed of 3,000 rpm for 30 minutes using a disper blade while maintaining a temperature of 25° C. or lower (first dispersing step).

Next, a bead mill (produced by Ashizawa Finetech Ltd.; product name: LMZ015) was used to mix the composition obtained after the first dispersing step at a circumferential speed of 8 m/s for 1 hour with zirconia beads of 1.25 mm in diameter such that the apparent filling rate was 80 volume % to produce a conductive material dispersion liquid (second dispersing step).

TABLE 1

|  |  |  | Example 1 | Example 2 | Example 3 | Example 4 | Example 5 |
|---|---|---|---|---|---|---|---|
| Conductive material dispersion liquid | Conductive material | Type | CNT | CNT | CNT | CNT | CNT |
|  |  | Content [mass %] | 5 | 5 | 5 | 5 | 5 |
|  | Dispersant | Type | HNBR-1 | HNBR-1 | HNBR-2 | HNBR-1 | HNBR-1 |
|  |  | Mw [—] ($\times 10^4$ omitted) | 13 | 13 | 23 | 13 | 13 |
|  |  | Content [mass %] | 1 | 1 | 1 | 1 | 1 |
|  | Dispersion medium | Type | NMP | NMP | NMP | NMP | NMP |
|  | Solid content concentration [mass %] |  | 6 | 6 | 6 | 6 | 6 |
|  | Production method |  | A-1 | B-2 | B-3 | A-3 | A-4 |
|  | Casson viscosity [(Pa·s)$^{1/2}$] |  | 0.5 | 1.5 | 1.8 | 2 | 0.04 |
|  | Casson yield value [Pa$^{1/2}$] |  | 2 | 7 | 5 | 7 | 6 |
|  | Hysteresis constant [—] |  | 0.2 | 0.4 | 0.2 | 0.5 | 0.5 |
| Smoothness |  |  | A | B | A | B | A |
| Flexibility |  |  | A | A | A | A | A |
| Low-temperature output characteristics |  |  | A | B | A | B | A |
| Rate characteristics |  |  | A | B | B | B | B |
| Cycle characteristics |  |  | A | B | A | B | B |

|  |  |  | Example 6 | Example 7 | Example 8 | Example 9 |
|---|---|---|---|---|---|---|
|  | Conductive material | Type | CNT | CNT | CNT | CNT |
|  |  | Content [mass %] | 5 | 5 | 5 | 5 |
|  | Dispersant | Type | HNBR-1 | HNBR-1 | ACL | HNBR-1 |
|  |  | Mw [—] ($\times 10^4$ omitted) | 13 | 13 | 12 | 13 |
|  |  | Content [mass %] | 1 | 1 | 1 | 1 |
|  | Dispersion medium | Type | NMP | NMP | NMP | NMP |
|  | Solid content concentration [mass %] |  | 6 | 6 | 6 | 6 |
|  | Production method |  | A-5 | A-6 | A-1 | C-2 |
|  | Casson viscosity [(Pa·s)$^{1/2}$] |  | 0.8 | 6 | 15 | 0.2 |
|  | Casson yield value [Pa$^{1/2}$] |  | 5 | 12 | 8 | 8 |
|  | Hysteresis constant [—] |  | 0.6 | 0.3 | 0.5 | 0.3 |
| Smoothness |  |  | A | B | B | B |
| Flexibility |  |  | A | B | B | A |
| Low-temperature output characteristics |  |  | B | B | B | B |
| Rate characteristics |  |  | B | B | B | A |
| Cycle characteristics |  |  | B | A | B | A |

TABLE 2

|  |  |  | Comparative Example 1 | Comparative Example 2 | Comparative Example 3 | Comparative Example 4 | Comparative Example 5 |
|---|---|---|---|---|---|---|---|
| Conductive material dispersion liquid | Conductive material | Type | CNT | CNT | CNT | CNT | CNT |
|  |  | Content [mass %] | 5 | 5 | 5 | 5 | 5 |
|  | Dispersant | Type | HNBR-1 | HNBR-1 | HNBR-2 | HNBR-2 | HNBR-1 |
|  |  | Mw [—] ($\times 10^4$ omitted) | 13 | 13 | 23 | 23 | 13 |
|  |  | Content [mass %] | 1 | 1 | 1 | 1 | 1 |
|  | Dispersion medium | Type | NMP | NMP | NMP | NMP | NMP |
|  | Solid content concentration [mass %] |  | 6 | 6 | 6 | 6 | 6 |
|  | Production method |  | A-2 | B-1 | B-1 | A-2 | C-1 |
|  | Casson viscosity [(Pa·s)$^{1/2}$] |  | 4 | 6 | 25 | 35 | 5 |
|  | Casson yield value [Pa$^{1/2}$] |  | 25 | 30 | 30 | 15 | 30 |
|  | Hysteresis constant [—] |  | 0.7 | 0.8 | 0.7 | 0.4 | 0.8 |
| Smoothness |  |  | D | D | D | C | D |
| Flexibility |  |  | A | B | C | D | B |
| Low-temperature output characteristics |  |  | C | C | D | B | D |
| Rate characteristics |  |  | C | D | D | C | D |

TABLE 2-continued

| Cycle characteristics | | | C | D | D | B | D |
|---|---|---|---|---|---|---|---|
| | | | Comparative Example 6 | Comparative Example 7 | Comparative Example 8 | Comparative Example 9 |
| Conductive material dispersion liquid | Conductive material | Type | CNT | CNT | CNT | CNT |
| | | Content [mass %] | 5 | 4 | 5 | 2 |
| | Dispersant | Type | HNBR-2 | PVP | HNBR-1 | HNBR-2 |
| | | Mw [−] (×10$^4$ omitted) | 23 | 1 | 13 | 23 |
| | | Content [mass %] | 1 | 1 | 1 | 0.4 |
| | Dispersion medium | Type | NMP | NMP | NMP | NMP |
| | Solid content concentration [mass %] | | 6 | 5 | 6 | 2.4 |
| | Production method | | C-3 | A-7 | A-8 | C-1 |
| | Casson viscosity [(Pa·s)$^{1/2}$] | | 70 | 40 | 0.02 | 0.02 |
| | Casson yield value [Pa$^{1/2}$] | | 30 | 25 | 15 | 4 |
| | Hysteresis constant [−] | | 0.6 | 0.8 | 0.8 | 0.8 |
| Smoothness | | | D | D | C | A |
| Flexibility | | | D | D | A | A |
| Low-temperature output characteristics | | | D | D | B | A |
| Rate characteristics | | | D | D | C | A |
| Cycle characteristics | | | B | D | D | D |

It can be seen from Tables 1 and 2 that it was possible to produce a positive electrode having excellent flexibility and smoothness and to cause a lithium ion secondary battery to display excellent cycle characteristics through this positive electrode when using the conductive material dispersion liquids of Examples 1 to 9, which each contained a conductive material including CNTs, a dispersant, and a dispersion medium and had a Casson viscosity, a Casson yield value, and a hysteresis constant that were not more than specific values. It can also be seen that the lithium ion secondary battery also had excellent low-temperature output characteristics and cycle characteristics in each of Examples 1 to 9.

INDUSTRIAL APPLICABILITY

According to the present disclosure, it is possible to provide a conductive material dispersion liquid for an electrochemical device and a slurry for an electrochemical device electrode with which it is possible to form an electrode that has excellent flexibility and smoothness and can cause an electrochemical device to display excellent cycle characteristics.

Moreover, according to the present disclosure, it is possible to provide an electrode for an electrochemical device that has excellent flexibility and smoothness and can cause an electrochemical device to display excellent cycle characteristics.

Furthermore, according to the present disclosure, it is possible to provide an electrochemical device that has excellent cycle characteristics.

The invention claimed is:

1. A conductive material dispersion liquid for an electrochemical device comprising a conductive material, a dispersant, and a dispersion medium, wherein
   the conductive material includes one or more carbon nanotubes, and
   the conductive material dispersion liquid for an electrochemical device has a Casson viscosity of 30 (Pa·s)$^{1/2}$ or less, a Casson yield value of 20 Pa$^{1/2}$ or less, and a hysteresis constant of 0.7 or less,
   the hysteresis constant being a value calculated by formula (I), shown below, $$\text{hysteresis constant } C = (N_1 - N_2)/N_1 \qquad (I)$$

where, in formula (I):
   $N_1$ is viscosity, in units of Pa·s, of the conductive material dispersion liquid for an electrochemical device at a shear rate of 10 s$^{-1}$ when viscosity is measured while increasing shear rate from 10$^{-2}$ s$^{-1}$ to 10$^3$ s$^{-1}$ using a rheometer at a temperature of 25° C.; and
   $N_2$ is viscosity, in units of Pa·s, of the conductive material dispersion liquid for an electrochemical device at a shear rate of 10 s$^{-1}$ when, after measurement of $N_1$, viscosity is measured while decreasing shear rate from 10$^3$ s$^{-1}$ to 10$^{-2}$ s$^{-1}$ using a rheometer at a temperature of 25° C.

2. The conductive material dispersion liquid for an electrochemical device according to claim 1, wherein the dispersant includes a nitrile group-containing monomer unit.

3. The conductive material dispersion liquid for an electrochemical device according to claim 1, wherein content of the carbon nanotubes is not less than 1.0 mass % and not more than 30.0 mass %, and content of the dispersant is not less than 0.1 mass % and not more than 3.0 mass %.

4. A slurry for an electrochemical device electrode comprising: the conductive material dispersion liquid for an electrochemical device according to claim 1; and an electrode active material.

5. An electrode for an electrochemical device comprising an electrode mixed material layer formed using the slurry for an electrochemical device electrode according to claim 4.

6. An electrochemical device comprising the electrode for an electrochemical device according to claim 5.

* * * * *